Inventors
ESMOND P. G. WRIGHT
DONALD A. WEIR
By Robert Harding Jr
Attorney

Inventors
ESMOND P. G. WRIGHT
DONALD A. WEIR
By Robert Harding Jr.
Attorney

Aug. 11, 1953 E. P. G. WRIGHT ET AL 2,648,725

ELECTRICAL DECODING CIRCUITS

Filed Nov. 25, 1950 6 Sheets-Sheet 3

Inventors
ESMOND P. G. WRIGHT
DONALD A. WEIR

By Robert Harding Jr.
Attorney

Aug. 11, 1953 E. P. G. WRIGHT ET AL 2,648,725

ELECTRICAL DECODING CIRCUITS

Filed Nov. 25, 1950 6 Sheets-Sheet 4

Inventors
ESMOND P. G. WRIGHT
DONALD A. WEIR

By Robert Harding Jr.
Attorney

Inventors
ESMOND P. G. WRIGHT
DONALD A. WEIR
By Robert Harding Jr.
Attorney

Inventors
ESMOND P. G. WRIGHT
DONALD A. WEIR
By Robert Harding Jr.
Attorney

Patented Aug. 11, 1953 2,648,725

UNITED STATES PATENT OFFICE 2,648,725

ELECTRICAL DECODING CIRCUITS

Esmond Philip Goodwin Wright and Donald Adams Weir, London, England, assignors to Standard Telephone and Cables Limited, London, England, a British company Application November 25, 1950, Serial No. 197,554
In Great Britain December 2, 1949

12 Claims. (Cl. 178—88)

The invention relates to apparatus for decoding characters in a multi-element two condition code.

It is an object of the present invention to provide an improved apparatus for decoding characters in a multi-element two condition code.

To achieve this object there is provided apparatus for decoding code combinations in a multi-element two condition (mark and space) code, which comprises $n$ two condition switching devices which are adapted to respond respectively to successive elements of a received code combination beginning with the first permutable element, means for converting the remainder of the permutable elements of said received code combination considered as a binary number into a decimal number, $2^n$ multi-position devices which are individually selectable by the characteristic settings of said first stage two condition devices, and means for setting a multi-position device selected by the settings of said two position devices to a position characteristic of the value of said decimal number, whereby said decoding is effected in two stages, each code combination corresponding to a single setting of a selected one of said multi-position devices.

The invention will now be described with relation to the accompanying drawings in which.

Figure 5:
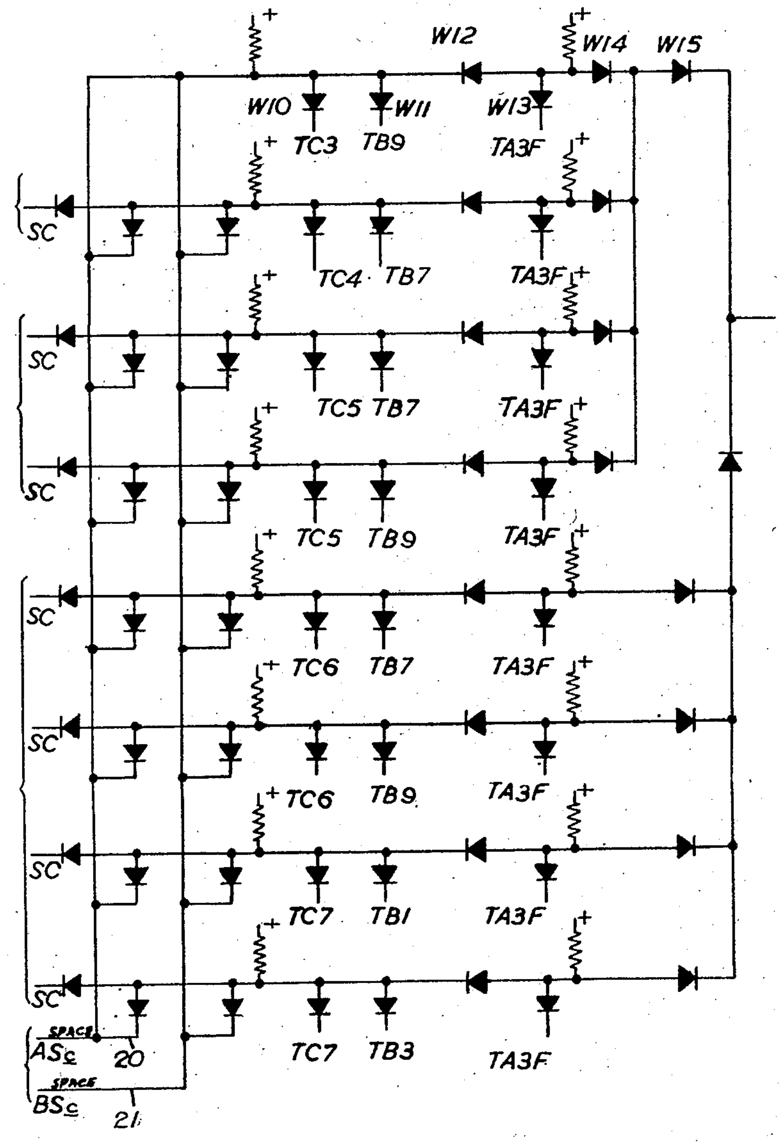
Figure 6:
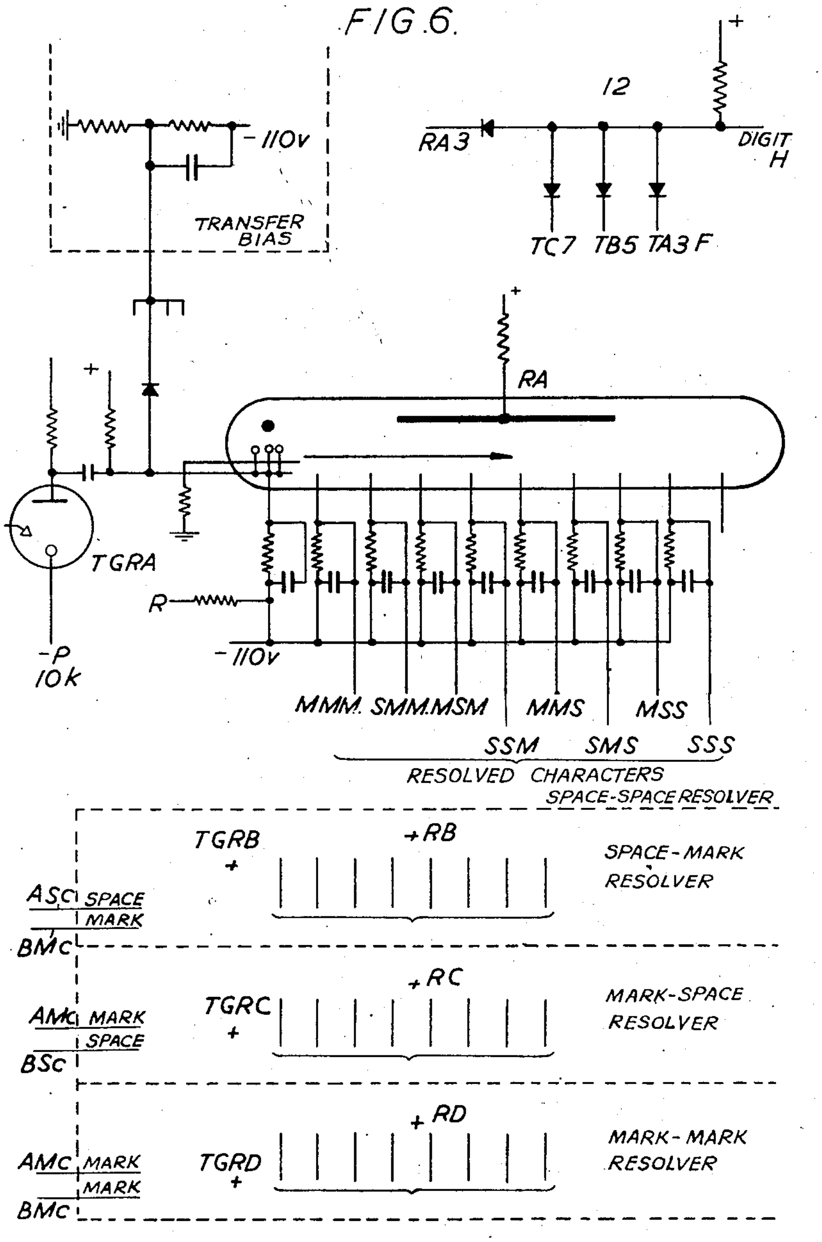

Figs. 5 and 6 (of which Fig. 6 should be placed to the right of Fig. 5) are the element resolution circuit.

*The general circuit arrangement (Fig. 1)*

Figure 1:
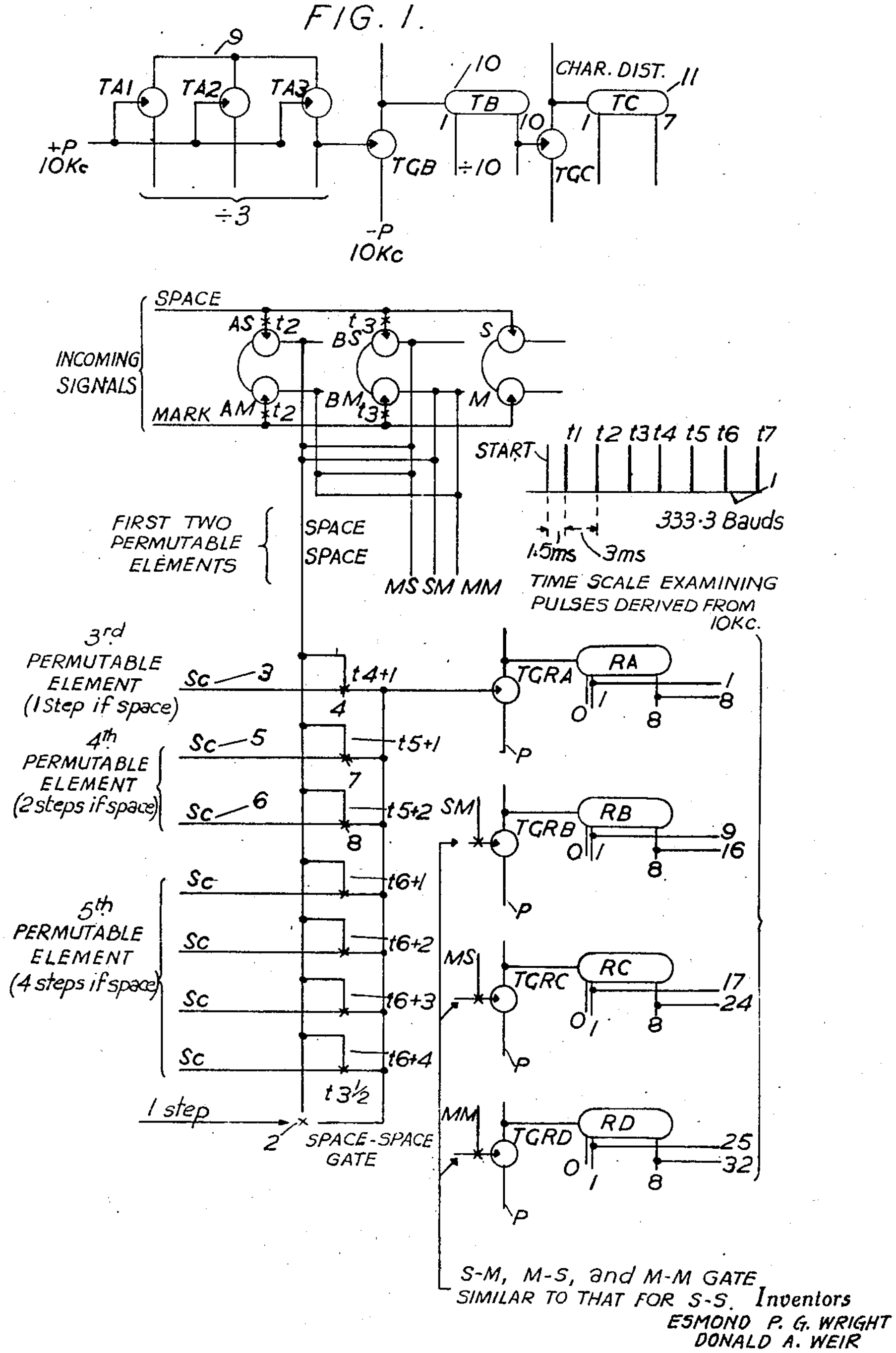
Fig. 1 is a simplified explanatory circuit diagram of the one embodiment.

This figure is an explanatory circuit in which all components except tubes and gates have been omitted. The tubes are represented in simplified form, and gates are represented by crosses on the leads each marked with a time position in the operating cycle at which it is open. In Fig. 1, a time scale 1 shows the timing of the signal elements of a received character. The received characters are five unit start-stop printing telegraph code characters, and the speed at which the characters are received in the present embodiment of the invention is 333.3 bauds. At this speed the duration of each individual element is 3 milliseconds. To decode the received character each element is examined at its centre point. Therefore the start element (if it were necessary to examine it) would be examined at $t1$ which is 1.5 ms. from the start, the first permutable element at $t2$, which is 4.5 ms. from the start, and so on.

The incoming signals are initially applied to a telegraph modulator circuit of well-known type, not shown, which applies a positive potential to the space lead when the received element is a space and to the mark lead when the received element is a mark. Thus the signal is converted initially into positive potentials on the appropriate leads in the appropriate time positions.

The first stage in the decoding process is to examine the first two permutable elements of the character. Obviously these can be any one of four possibles, mark-mark, space-space, space-mark and mark-space. This examination is effected by two pairs of gas tubes AS, AM and BS, BM connected as flip-flop pairs, i. e. so connected as to have two stable conditions to either of which they can be set. Each tube of pair AS, AM is connected to one lead, AS being connected to the space lead and AM to the mark lead, via gating circuits (indicated in Fig. 1 by a cross) which cause the actual connection of the tubes to their respective leads at time position $t2$, which is the examining position for the first permutable element. This gate circuit, and others used throughout the present circuit is of the type fully described and claimed in U. S. Patent No. 2,498,986 issued February 28, 1950. If this element is a space, AS fires (extinguishing AM if it is discharging) or remains firing if already discharging. Similarly AM fires (or stays discharging if already discharging) if the signal element is a mark. Whichever of tubes AS or AM is discharging after time $t2$ has a positive potential on its cathode. Flip flop pair BS, BM is similarly controlled from the space and mark leads respectively at time $t3$, the centre-point of the second permutable element. The cathode leads of tubes AS, AM, BS and BM are interconnected as shown in Fig. 1 to give four leads, each representing one possible condition for the first two permutable elements.

Each of these four leads controls a multi-cathode tube RA, RB, RC, RD from a trigger tube TGRA, TGRB, TGRC, TGRD via a gating circuit such as that diagrammatically illustrated for the space-space lead.

It will be assumed that the first two permutable elements were space-space, so the subsequent circuit operation will be described for this condition. It is, of course, similar for the other three possible conditions. Immediately after the first two permutable elements, the space-space gate 2 is opened at time $t3\frac{1}{2}$, i. e. midway between second and third permutable elements to cause trigger tube TGRA to fire to step RA from its rest position to its first position. This occurs because the opening of gate 2 applies a positive potential to the trigger electrode of TGRA, which fires on the P—pulses, as more fully described below.

As will be seen from Fig. 1, all incoming signals are applied to a third flip flop pair S, M, which is so connected to the space and mark leads that all incoming spaces fire S and all incoming marks fire M. The start element, a space, will fire tube S and the first two permutable elements will fire either or both of these tubes, but this firing will be ineffective. On the third permutable element, also, one of these tubes will be fired. If tube S fires when the third permutable element is a space signal the positive potential produced at its cathode is applied to the Sc lead 3. At $t4+1$ (.6 ms. after S fires if the element is a space) gate 4 opens to permit the positive potential on lead 3 to cause TGRA to fire on the next P— pulse, which steps tube RA to its second position. If the third permutable element is a mark, tubes TGRA and RA are unfired, so the discharge in RA remains at its first gap position.

If the fourth permutable element is a space signal the positive produced on the cathode of tube S is applied to two Sc leads 5 and 6. Lead 5 is connected to TGRA via gate 7 which opens at $t5+1$, when tube TGRA fires on the P— pulse if there is a positive potential on lead 5 to step RA once. At $t5+2$ (.6 ms. after $t5+1$), lead 6 is connected via gate 8 to TGRA, and TGRA fires on the next P— pulse if there is a positive on lead 6. Thus if the element is a space element, leads 5 and 6 will bear positive potentials and the tube RA steps twice.

It will be seen that for the fifth (and last) permutable element, if the element is a space element, tube RA is caused to step 4 times, at times $t6+1$, $t6+2$, $t6+3$ and $t6+4$ respectively.

Thus if the third permutable element is a space RA steps once, if the fourth permutable element is a space RA steps twice and if the fifth permutable element is a space RA steps four times. This will be illustrated by a few examples. If the signal is S—S—M—M—M, tube RA does not step for the last three permutable elements, so it remains on its position 1. If the signal is S—S—M—M—S, tube RA does not step on the third and fourth elements but does step four times on the fifth element, and therefore ends the signal on its fifth position. If the signal is S—S—M—S—M, tube RA does not step on third and fifth elements, but does step twice on the fourth element, so it stands on its third position at the end of the signal. If the signal is S—S—S—M—S, tube RA steps once on the third element and four times on the fifth element, but not at all on the fourth element, so its final position is on its sixth position. Thus for each of eight possible combinations of the last three permutable elements there is one unique position in which RA will stand.

Tube RB is similarly controlled if the first two permutable elements are space-mark, RC if they are mark-space and RD if they are mark-mark. Thus the final condition in response to a character is with one tube of RA to RD standing in that one position of 32 possibles which characterises the received character.

The timing of the circuit is controlled from a 10 kc. pulse source emitting simultaneously positive and negative P pulses. These pass via a divide by 3 counter 9 using three cold-cathode tubes and a divide by 10 counter 10 to the character distributor 11. The divide by numeral 10 counter and the character distributor 11 are each multi-gap cold cathode tubes. The latter runs, therefore, at 333.3 cycles per sec., the speed corresponding to 333.3 bauds. Seven outputs, from the character distributor are used and each occurs at the beginning of one signal element of a received character, and in combination with the counter tube TB permit any required timing to be obtained. As will be indicated, the start element of a received character initiates the operation of the time base circuit..

Figure 2:
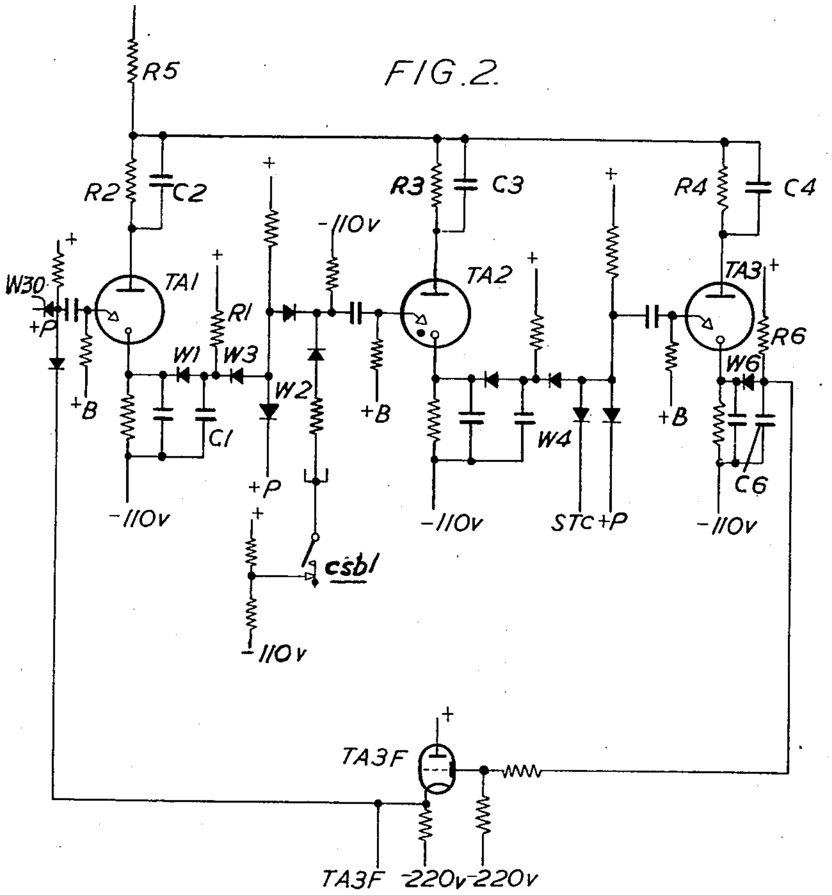
Fig. 2 is the first stage of a time base circuit for use in conjunction with the invention.
Figure 2:
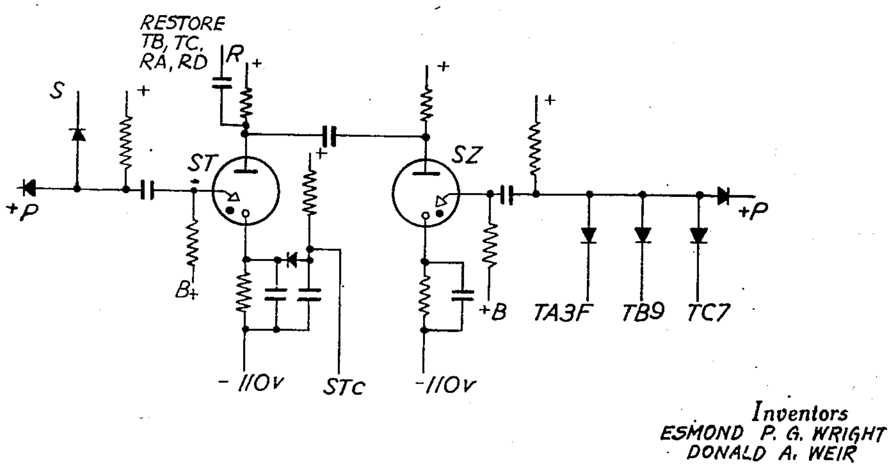

*Divide by three counter (Fig. 2)*

This comprises three cold cathode tubes TA1, TA2, TA3 driven from the P+ pulse source. These tubes are interconnected in the manner described in the co-pending application No. 249,848, filed October 5, 1951. This circuit is controlled by a flip-flop pair ST, SZ. Near the end of a cycle of the time base circuit [at the time position in that cycle defined by discharges at TA3F, TB4, TC7 (see below)], the stop tube SZ fires to extinguish start tube ST. When ST fires when the start element of a character is received (see below) the negative-going pulse produced at its anode restores tubes TB and TC (Fig. 3) and tubes RA to RD (Fig. 6) to their rest positions.

When the circuit is switched on, a relay CSB (not shown) operates and at its make before break contact *csb1* applies a positive potential to the trigger electrode of tube TA2 during the "bunching time" of this contact, i. e. while all three contacts are bunched together. Tube TA2 therefore fires.

The interconnections between tubes TA1 and TA2 include a condenser charging circuit R1—C1 connected to the cathode of TA1 via W1. In the absence of discharge in TA1 the potential of the cathode of TA1 is −110 volts, so the junction between R1 and C1 is held at substantially this potential. When W1 is biassed positively when TA1 is discharging, C1 charges through R1 from the full positive potential present on the cathode of TA1 when the latter is discharging. This causes the potential at the R1—C1 junction to rise slowly to its full value. Hence there is no chance of the next tube also firing on the same P+ pulse. This feature is fully described in the above-mentioned application No. 249,848, filed October 5, 1951.

The circuit between the cathode of TA2 and the trigger of TA3 is similar to that between the cathode of TA1 and trigger of TA2 except for the connection via gating rectifier W4 to the cathode of the start tube ST. Therefore unless ST is discharging and biassing this rectifier positive, the divider circuit rests with TA2 discharging.

It will be seen that each tube TA1, TA2, TA3, has a separate anode resistance R2, R3, R4 in addition to the common anode resistance R5. This means that the anode potential of unfired tubes is slightly higher than what it would be if there were no such separate anode resistance. This is because the voltage drop at the anode of a discharging tube is shared between two resistances, e. g. R5 and R2, assuming TA1 to be discharging. Then since no current flows in R3 or R4 the anode potentials of TA2 and TA3 must equal the potential at the R5—R2 junction. Condensers C2, C3, C4 connected across R2, R3 and R4 respectively act, in effect, as pulse by-passes when a tube is fired, and allow the negative going pulse produced thereby to extinguish the previously fired tube. This form of frequency division circuit is more fully described in said co-pending application.

On the first P+ pulse which occurs during a received character's start element (always a space), tube ST fires as both rectifiers connected to the trigger electrode are simultaneously biassed positive and restores the tubes TB, TC and RA, RB, RC and RD to their rest conditions. Tube ST firing also biasses rectifier W4 positive and allows the next P+ pulse to fire TA3.

Figure 3:
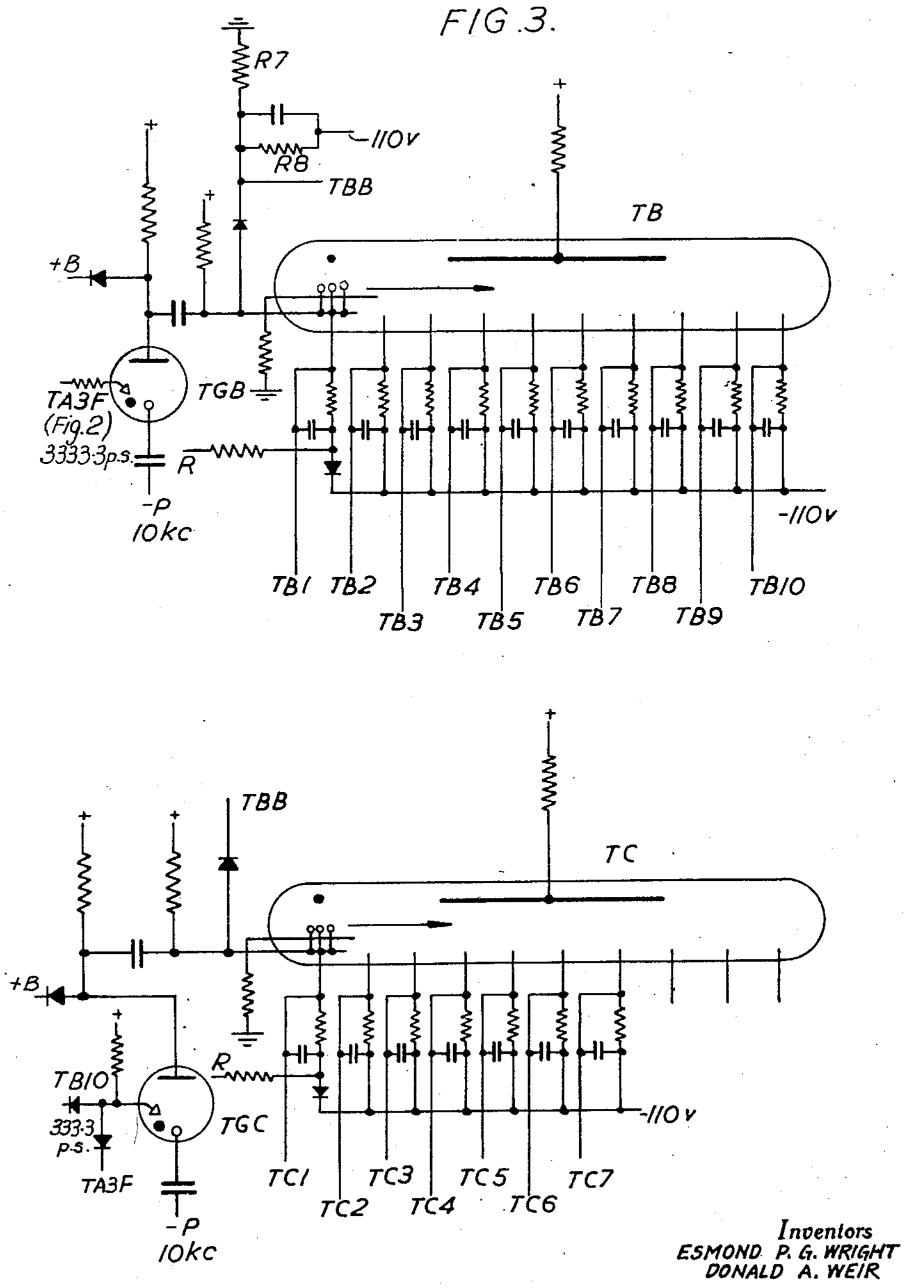
Fig. 3 is the second stage of the time base circuit.

The cathode of tube TA3 is connected via rectifier W6 (with time constant delay circuit R6, C6) to the input of a cathode follower TA3F. When the potential across C6 has risen to the full potential on the cathode of TA3, the cathode output potential of TA3F biasses W30 positive so that the next P+ pulse fires TA1. The output of TA3F is also applied to the divide by ten circuit (Fig. 3). The output of TA3F is a slow-rising but comparatively quick falling pulse since TA3F is a cathode follower whose input is of this form (see above).

*Divide by ten circuit (Fig. 3)*

The divide by ten circuit uses a multi-cathode tube TB of the type described in U. S. Patent No. 2,553,585, issued May 22, 1951. This tube normally stands with the discharge on its first cathode, the discharge stepping on to the next cathode each time the trigger tube TGB fires. This happens at the coincidence of the maximum voltage on TA3F cathode applied to its trigger and a P— pulse applied to its cathode. The tube thus fires and the drop of anode potential caused thereby applies a negative potential to the transfer electrodes and cathodes of tube TB. By ionisation coupling this causes the next gap along the tube to discharge. As the gaps in this tube are arranged in a circle, the next gap after the tenth is the first. At TB1 to TB10, ten timed outputs are available.

*Character distributor (Fig. 3)*

This comprises a multi-cathode tube TC, of which only seven gaps (one for each element of a start-stop printing telegraph character) are used. The other three cathodes (if a ten-point tube is used) are not connected. The trigger tube TGC fires at the coincidence of TB10 discharging and TA3F fully conducting (see above) with a P— pulse, and steps TC at that time.

Both tubes TB and TC are reset over the connections marked R from the anode of ST (Fig. 2) as has been described above. The bleeder circuit R7—R8 provides a source of biassing potential to bias the trigger electrodes of both tubes TB and TC it being connected to TC over the connection marked TBB. The shield electrode is earthed via a resistance.

*Element storage and detection circuits (Fig. 4)*

In the ensuing description, time positions in an operational cycle are defined by reference to the position of the discharges in the three stages of the time base circuit. The circuit which investigates the first permutable code element is a flip-flop pair of cold-cathode gaseous discharge tubes AS, AM. The trigger electrode of AS is connected to the space lead and the trigger electrode of AM to the mark lead over gate circuits which open at TC2, TB5, TA3.

This time position is half way through duration of the first permutable element. During this element a positive potential appears on one or other of the space or mark leads depending on whether the element is a space or a mark. If the tube to which the positive potential pulse is applied is discharging, no change is made in the condition of the two tubes. If, however, the positive potential pulse is applied to the quiescent tube, that tube fires and via the anode coupling condenser extinguishes the other tube in well known manner. Whichever tube is discharging has a positive potential on its cathode.

The circuit for examining the second permutable element comprises a flip-flop pair BS, BM, identical to AS, AM except that the gates connect the triggers to space and mark leads respectively at TC3, TB5, TA3, the half-way point of the second permutable element.

The cathode leads of AS, AM and BS, BM are interconnected to control selection of one of the multi-gap resolvers (see Figs. 5 and 6). Thus (see Fig. 5) each resolver is controlled from two leads such as the ASc and BSc leads 20 and 21 (see below). The suffix *c* designates a cathode output connection.

The third flip-flop pair S, M is identical to the other two except that its gates connect the triggers to the space and mark leads respectively at TB5, TA3, i. e. at the halfway point of every element of a character. Thus either S or M fires for every element of a received character. The only output taken from this flip-flop in the present embodiment is that taken from the cathode of S and marked Sc.

*Resolving circuit (Figs. 5 and 6)*

Figs. 5 and 6 show the resolving circuits associated with the space-space condition. As indicated diagrammatically, the circuits for space-mark (trigger tube TGRB and tube RB), mark-space (TGRC and RC) and mark-mark (TGRD and RD) are identical to those for space-space except that they are selected by different combinations of the first two elements.

With both AS and BS discharging, indicating that the first two permutable elements were spaces, a positive potential is applied over leads 20 and 21 to the gate circuits. At TC3, TB9, TA3F (8.7 ms. after the cycle started) with AS and BS discharging rectifiers W10 and W11 are biassed positive from TC3 and TB9, W12 from the space leads, and W13 from TA3F, so positive is applied over W14 and W15 to the trigger of tube TGRA, which fires to the P— pulse and steps RA from its rest (or zero) position to its first position. This single step is the $t3\frac{1}{2}$ step referred to with reference to the explanation given with respect to Fig. 1.

Figure 4:
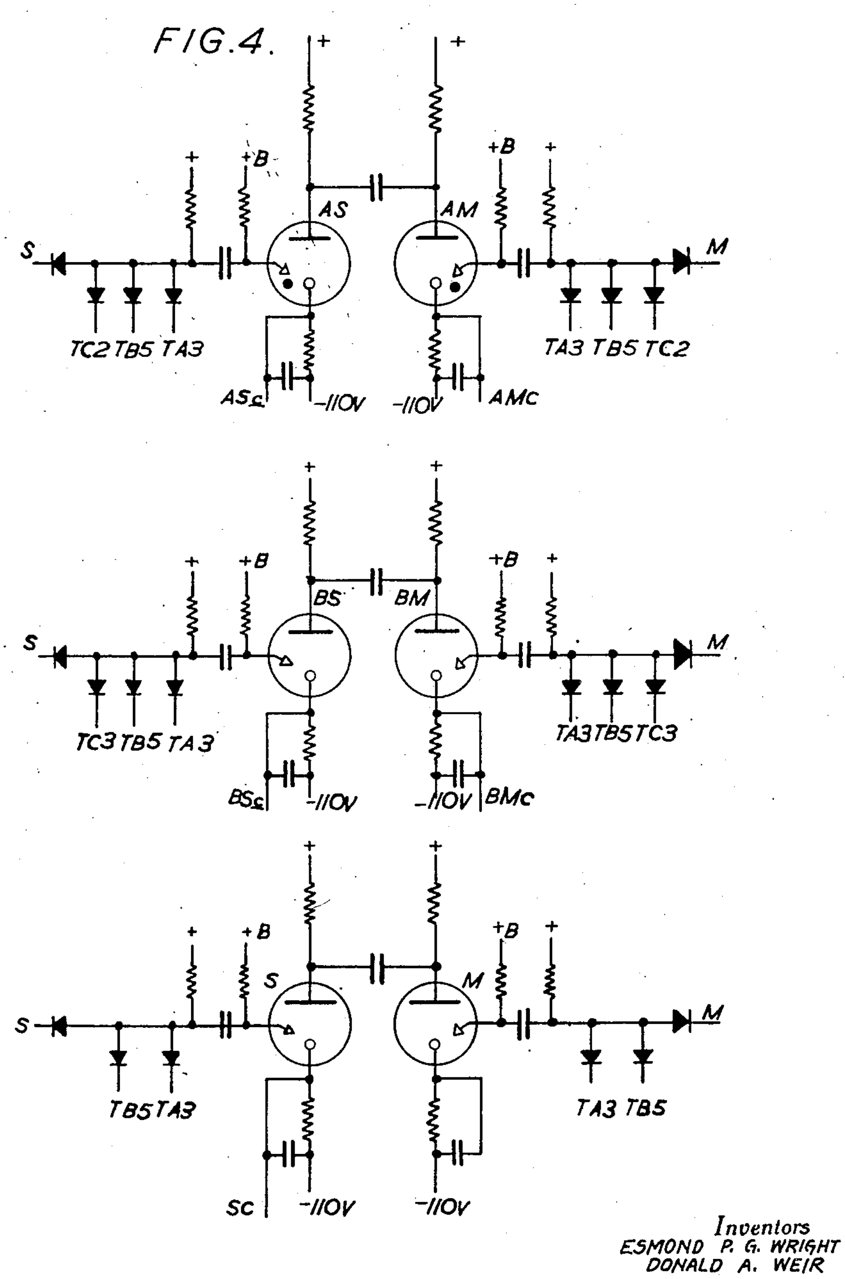
Fig. 4 is the element storage and control circuits.

If the next three elements are all marks, none of the other gates shown in Fig. 5 permit TGRA to fire since S is quiescent, and all the Sc leads therefore go to a highly negative potential (see Fig. 4). Therefore if the signal is S—S—M—M—M, the final position will be with tube RA in its position 1.

If the third permutable element is a space, S fires and applies positive to the Sc leads. At TA3F, TB7, TC4, (11.1 ms. after the beginning of the cycle and half way through the third permutable element), the tube TGRA fires and steps tube RA once. If the last two permutable elements are marks, the final position is with RA in its position 2, indicating that the signal is S—S—S—M—M.

If the fourth permutable element is a space, tube S applies positive potential to the Sc leads. However, this time tube TGRA is fired twice (and tube RA stepped twice) if the element is a space. For this purpose Sc controls TGRA over two gating circuits, one closing to fire TGRA at TA3F, TB7, TC5 (14.1 ms. after the beginning of the cycle) and the other closing to fire TGRA again at TA3F, TB9, TC5 (14.7 ms. after the beginning of the cycle). Since TGRA is pulse fed it is extinguished between pulses. Therefore a space for the fourth permutable element steps RA twice and a mark not at all.

If the signal is S—S—M—S—M, the final position is with RA in its third position (the initial step plus the double step for the space as the fourth element). If the signal is S—S—S—S—M the final position is with RA in its fourth position (the initial step plus the single step for the space as the third element plus the double step for the space as the fourth element).

If the fifth permutable element is a space, S applies positive potential to the Sc leads. However, this time TGRA is fired four times to step RA four times if the element is a space. For this purpose Sc controls TGRA over four gating circuits which fire TGRA at TA3F, TC6, TB7 (17.1 ms.) at TA3F, TC6, TB9 (17.7 ms.) at TA3F, TC7, TB1 (18.3 ms.) and at TA3F, TC7, TB3 (18.9 ms.). It will be noted that the last two of these occur during the stop element, but this is permissible since no other operation is carried out during this element until well after the time represented by TA3F, TB3, TC7. Thus if the fifth permutable element is a space tube RA steps four times and if it is a mark, RA does not step at all.

If the signal received is S—S—M—M—S, the fired position is with RA in its fifth position (initial step plus the quadruple step for the space fifth element). If the signal received is S—S—S—M—S the final position is with RA in its sixth position (initial step plus single step for space third element plus quadruple step for space fifth element). If the signal is S—S—M—S—S the final position is with RA in its seventh position (initial step plus double step for space fourth element plus quadruple step for space fifth element). If the signal received is S—S—S—S—S the final position is with RA in its eighth position (initial step plus single step plus double step plus quadruple step).

As has been stated, the gating control circuits and operation of the other three resolvers are similar to the space-space circuit, so no description of them is required.

Thus the circuit gives a separate output for every element of the code in use. Cathodes for non-used characters can be connected to a common resistance. For each character used an output gate is provided, a typical example being that shown at 12, Fig. 6, for S—S—M—S—M (RA3 cathode), representing digit H on the lower case in normal teleprinter practice. The output gates are opened at TC7, TB5, TA3F (19.5 ms.), after all the stepping has been effected. The output from the circuit 12 goes to any desired utilisation circuit, such as a cold cathode tube controlling a relay which causes printing of the character.

Although the invention has been described for a system in which the multi-cathode resolving tubes are stepped on space signals, it is clear that stepping on mark signals is equally feasible. If the circuit is meant to respond to one particular character in a particular resolver tube, e. g. S—S—M—S—M, it could be arranged that the tube steps to its eighth position on the particular character only. Thus the single step occurs if the third element is a mark, the double step if the fourth element is a space and the quadruple element if the fifth element is a mark. Such an arrangement would minimise the risk of premature operation of the circuit in response to the desired character.

The divide by ten circuit, the character distributor and the resolvers have been described as using multi-cathode tubes, but it would be within the scope of the present invention to use chains of normal single cold cathode tubes.

The system of detection and translation is also applicable to any multi-element two condition code such as a seven-unit constant total code with suitable modifications.

While the principles of the invention have been described above in connection with specific embodiments, and particular modifications thereof, it is to be clearly understood that this description is made only by way of example and not as a limitation on the scope of the invention.

What we claim is:

1. Apparatus for decoding characters in printing telegraph code comprising a flip flop pair of cold cathode gaseous discharge tubes for detecting the condition (mark or space) of each element of a character, a pair of flip flop pairs for storing the conditions of the first two permutable elements of the character, four multi-gap cold cathode gaseous discharge tubes, gate circuits under control of said pair of flip flop pairs adapted to select that multi-gap tube which corresponds to the condition of the first two permutable elements of the character, means responsive to selection of one particular multi-gap tube to cause the selected multi-gap tube to step from its rest position to its first position, means for assigning to each of the last three permutable elements of the combination a numerical value characteristic thereof, means for causing said selected multi-gap tube to step in response to each permutable element whose numerical value exceeds zero, and means responsive to the final position of the discharge in said multi-gap tube to indicate the identity of said character.

2. Apparatus for decoding code combinations in a multi-element two condition (mark and space) code, which comprises $n$ two condition switching devices which are adapted to respond respectively to successive elements of a received code combination beginning with the first permutable element, means for converting the remainder of the permutable elements of said received code combination considered as a binary number into a decimal number, $2^n$ multi-position devices which are individually selectable by the characteristic settings of said first stage two condition devices, and means for setting a multi-position device selected by the settings of said two position devices to a position characteristic of the value of said decimal number, whereby said decoding is effected in two stages, each code combination corresponding to a single setting of a selected one of said multi-position devices.

3. Apparatus as claimed in claim 2 and comprising a source of timed pulses under whose control said decoding operations occur, a start device arranged on receipt of the first element of a code combination to start said timed pulse source, and a gating network arranged to supply to the selected multi-position device a number of said pulses equal to said decimal number.

4. Apparatus as claimed in claim 3 and comprising a further two condition switching device for responding to permutable code elements subsequent to said first $n$ permutable elements, said further two condition device being arranged to control said gating network.

5. Apparatus as claimed in claim 4 and in which each said two condition device comprises a discharge tube flip-flop of the either side stable type, and in which one tube of each said pair is arranged to be discharging after a mark element has been received and the other tube of that pair is arranged to be discharging after a space element has been received.

6. Apparatus as claimed in claim 5 and comprising gate circuits interconnecting each of said two condition devices which are controlled by said first $n$ permutable code elements, each said gate circuit only opening at a time position appropriate to one of said first $n$ permutable elements.

7. Apparatus as claimed in claim 6 and comprising an output lead from each tube of said flip-flop pairs which respond to and store the conditions of said first $n$ permutable elements, whereby $2^n$ output leads are obtained, and $2^n$ gate circuits each controlled by one of said output leads from each said flip-flop, each said gate circuit only being rendered effective to select one of said multi-position devices when all of its controlling tubes are discharging.

8. Apparatus as claimed in claim 7 and in which the permutable code elements subsequent to said first $n$ permutable elements are assigned a value of 0 if of one condition and a value of one, two, four . . . (increasing or decreasing in geometric progression) respectively if of said other condition.

9. Apparatus for decoding code combinations in a multi-element two condition (mark and space) code, which comprises a source of timed pulses, means responsive to reception of the first code element of a code combination to start said timed pulse source, $n$ two condition switching devices each adapted to respond to a permutable code element applied thereto, means under control of said timed pulse source for causing said $n$ two condition devices to respond respectively to successive code elements beginning with the first permutable element, $2^n$ multi-position devices each of which is characteristic of a particular combination of the first $n$ permutable code elements of a code combination, a first plurality of gate circuits under control of said two condition devices and adapted to select that one of said multi-position devices which is characteristic of the first $n$ permutable code elements of the combination being decoded, a further gate circuit individual to each said multi-position device and adapted to apply a single pulse from said timed pulse source to its associated multi-position device when said multi-position device is selected, said multi-position device being set to its first operative position in response to said pulse, a further two condition device for responding to permutable code elements subsequent to said first $2^n$ permutable elements, a second plurality of gate circuits for converting each said permutable code element subsequent to said first $n$ permutable elements considered as a binary digit into its decimal equivalent, said further gate circuit associated with the selected multi-position device being adapted to operate under control of said second plurality of gate circuits to apply to the selected multi-position device a number of pulses equal to the decimal equivalent of each permutable code element subsequent to said first $n$ permutable elements, whereby said selected multi-position device is set from its rest position to a position indicative of the sum of said initial single pulse of all of said decimal equivalents, and means responsive to reception of the final code element of said combination to stop said timed pulse source.

10. Apparatus as claimed in claim 9 and in which the permutable code elements subsequent to said first $n$ permutable elements are assigned a value of 0 if of one condition and a value of one, two, four . . . (increasing or decreasing in geometric progression) respectively if of said other condition.

11. Apparatus as claimed in claim 10 and in which the permutable code elements subsequent to said first permutable code elements of a special character (such as a brackets symbol) are together assigned the maximum numerical value available in one of said multi-position devices irrespective of the conditions of elements, whereby the risk of premature response to such a character is minimized.

12. Apparatus for decoding code combinations in a multi-element two condition (mark and space) code comprising means for responding to the condition of each code element, a source of timed impulses for examining every element of a code combination separately, four multi-position devices, means controlled by the first two permutable elements of a code combination to select that one of said four multi-position devices which is characteristic of the first two permutable elements of the code combination, means for converting each of the permutable elements of the code combination subsequent to said first two permutable elements into a numerical value characteristic thereof, means for applying each said numerical value to the selected multi-position device which then summates said numerical values, and means responsive to said summation to indicate the identity of the received code combination.

ESMOND PHILIP GOODWIN WRIGHT.
DONALD ADAMS WEIR.

References Cited in the file of this patent

UNITED STATES PATENTS

| Number | Name | Date |
|---|---|---|
| 2,459,904 | Watson | Jan. 25, 1949 |
| 2,520,142 | Herbst | Aug. 29, 1950 |

FOREIGN PATENTS

| Number | Country | Date |
|---|---|---|
| 563,918 | France | Oct. 6, 1923 |